United States Patent
Lu et al.

(10) Patent No.: US 11,978,149 B2
(45) Date of Patent: May 7, 2024

(54) UV MAP USING WEIGHT PAINTING

(71) Applicant: INTERNATIONAL BUSINESS MACHINES CORPORATION, Armonk, NY (US)

(72) Inventors: Cindy Han Lu, San Jose, CA (US); Angela Monique Lloyd, Austin, TX (US); Thai Quoc Tran, San Jose, CA (US); Weiwei Liu, Irvine, CA (US)

(73) Assignee: The Weather Company, LLC, Brookhaven, GA (US)

( * ) Notice: Subject to any disclaimer, the term of this patent is extended or adjusted under 35 U.S.C. 154(b) by 0 days.

(21) Appl. No.: 17/304,390

(22) Filed: Jun. 21, 2021

(65) Prior Publication Data

US 2022/0405999 A1   Dec. 22, 2022

(51) Int. Cl.
| | |
|---|---|
| G06T 15/04 | (2011.01) |
| G06T 7/13 | (2017.01) |
| G06T 11/00 | (2006.01) |
| G06T 11/40 | (2006.01) |
| G06T 17/20 | (2006.01) |

(52) U.S. Cl.
CPC ............... G06T 15/04 (2013.01); G06T 7/13 (2017.01); G06T 11/001 (2013.01); G06T 11/40 (2013.01); G06T 17/20 (2013.01)

(58) Field of Classification Search
None
See application file for complete search history.

(56) References Cited

U.S. PATENT DOCUMENTS

| | | | | |
|---|---|---|---|---|
| 5,363,119 | A | * | 11/1994 | Snyder ............... G06T 3/40 345/555 |
| 8,379,037 | B1 | | 2/2013 | Praun et al. |
| 8,462,147 | B2 | | 6/2013 | Sugden |
| 8,587,608 | B2 | | 11/2013 | Falco, Jr. et al. |
| 9,652,882 | B2 | | 5/2017 | Cerny et al. |
| 10,075,701 | B2 | | 9/2018 | Cole |
| 10,721,454 | B2 | | 7/2020 | Cole et al. |

(Continued)

OTHER PUBLICATIONS

Hughes et al., "The Best Free 3D Models, Free 3D Models: 25 Quality Assets For Your CG Projects," Creative Bloq, Oct. 11, 2020, 28 pages, https://www.creativebloq.com/3d/free-3d-models-10121127.

(Continued)

Primary Examiner — Anh-Tuan V Nguyen

(74) Attorney, Agent, or Firm — Barnes & Thornburg LLP

(57) ABSTRACT

A method, computer system, and a computer program product for projecting a 3D model defined by x, y, z coordinates onto the surface of a 2D image defined by u, v coordinates is provided. The present invention may include receiving a 3D model having a plurality of polygons, wherein certain edges are marked as seams. The present invention may include receiving input from a user, wherein the input comprises painting one or more parts of the 3D model in different colors, wherein the colors correspond with a weight of the area painted. The present invention may include unwrapping, by a processor, a 2D texture from the 3D model using a projection algorithm. The present invention may include generating a rectangular boundary around each island. The present invention may include scaling each island according to a gradient score.

20 Claims, 6 Drawing Sheets

(56) References Cited

U.S. PATENT DOCUMENTS

| | | | | |
|---|---|---|---|---|
| 2002/0154132 | A1* | 10/2002 | Dumesny | G06T 15/04 345/582 |
| 2004/0145593 | A1* | 7/2004 | Berkner | G06F 16/9577 345/619 |
| 2004/0196294 | A1* | 10/2004 | Hong | G06T 11/001 345/582 |
| 2004/0225968 | A1* | 11/2004 | Look | G06F 3/04812 715/778 |
| 2008/0253685 | A1* | 10/2008 | Kuranov | G06T 7/33 382/284 |
| 2010/0194768 | A1* | 8/2010 | Schrag | G06T 15/04 345/584 |
| 2011/0238486 | A1 | 9/2011 | Liu | |
| 2011/0249023 | A1* | 10/2011 | Nakamura | G06T 19/00 345/619 |
| 2012/0236020 | A1* | 9/2012 | Paris | G06T 5/009 345/589 |
| 2015/0103074 | A1* | 4/2015 | Cai | G06V 10/46 345/419 |
| 2015/0287230 | A1* | 10/2015 | Cerny | G06T 15/005 345/501 |
| 2015/0351477 | A1* | 12/2015 | Stahl | G06T 15/04 700/132 |
| 2016/0027200 | A1* | 1/2016 | Corazza | G06T 15/04 345/420 |
| 2017/0221263 | A1* | 8/2017 | Wei | G06T 17/205 |
| 2018/0075641 | A1* | 3/2018 | Ceylan | G06T 15/04 |
| 2018/0101978 | A1* | 4/2018 | Hirota | G06T 15/04 |
| 2019/0035149 | A1 | 1/2019 | Chen | |
| 2019/0213778 | A1* | 7/2019 | Du | G06T 17/00 |
| 2019/0259194 | A1 | 8/2019 | Daniel et al. | |
| 2020/0211255 | A1* | 7/2020 | Elg | G06T 15/04 |
| 2021/0241510 | A1* | 8/2021 | Kuribayashi | G06T 15/04 |
| 2021/0365707 | A1* | 11/2021 | Mao | H04N 23/45 |
| 2022/0003251 | A1* | 1/2022 | Wang | D04B 1/102 |
| 2022/0028150 | A1* | 1/2022 | Soulvie | G06T 17/20 |
| 2022/0058859 | A1* | 2/2022 | Casallas Suarez | G06N 20/00 |

OTHER PUBLICATIONS

Mell et al., "The NIST Definition of Cloud Computing," National Institute of Standards and Technology, Special Publication 800-145, Sep. 2011, pp. 1-7.

Mccauley, et al., "Free 3D models: 25 quality assets for your CG projects," Creative Blog [online]. Sep. 9, 2022 [accessed on Sep. 6, 2023], 27 pages, Retrieved from the Internet: <URL: https://www.creativebloq.com/3d/free-3d-models-10121127>.

* cited by examiner

UV MAP USING WEIGHT PAINTING

BACKGROUND

The present invention relates generally to the field of computing, and more particularly to automatic partitioning of UV maps based on weight painting.

UV mapping may be a three-dimensional modeling process of projecting a two-dimensional image onto the surface of a three-dimensional model to give the two-dimensional image color and/or texture. The "U" and the "V" of "UV" may refer to the horizontal and vertical axes, respectively, of the two-dimensional space, as X, Y, and Z may already be used in a three-dimensional space. Three-dimensional modeling and/or texturing software may provide an automated process to unwrap a three-dimensional model.

SUMMARY

Embodiments of the present invention disclose a method, computer system, and a computer program product for projecting a 3D model defined by x, y, z coordinates onto the surface of a 2D image defined by u, v coordinates is provided. The present invention may include receiving a 3D model having a plurality of polygons, wherein certain edges are marked as seams. The present invention may include receiving input from a user, wherein the input comprises painting one or more parts of the 3D model in different colors, wherein the colors correspond with a weight of the area painted. The present invention may include unwrapping, by a processor, a 2D texture from the 3D model using a projection algorithm. The present invention may include generating a rectangular boundary around each island. The present invention may include scaling each island according to a gradient score.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
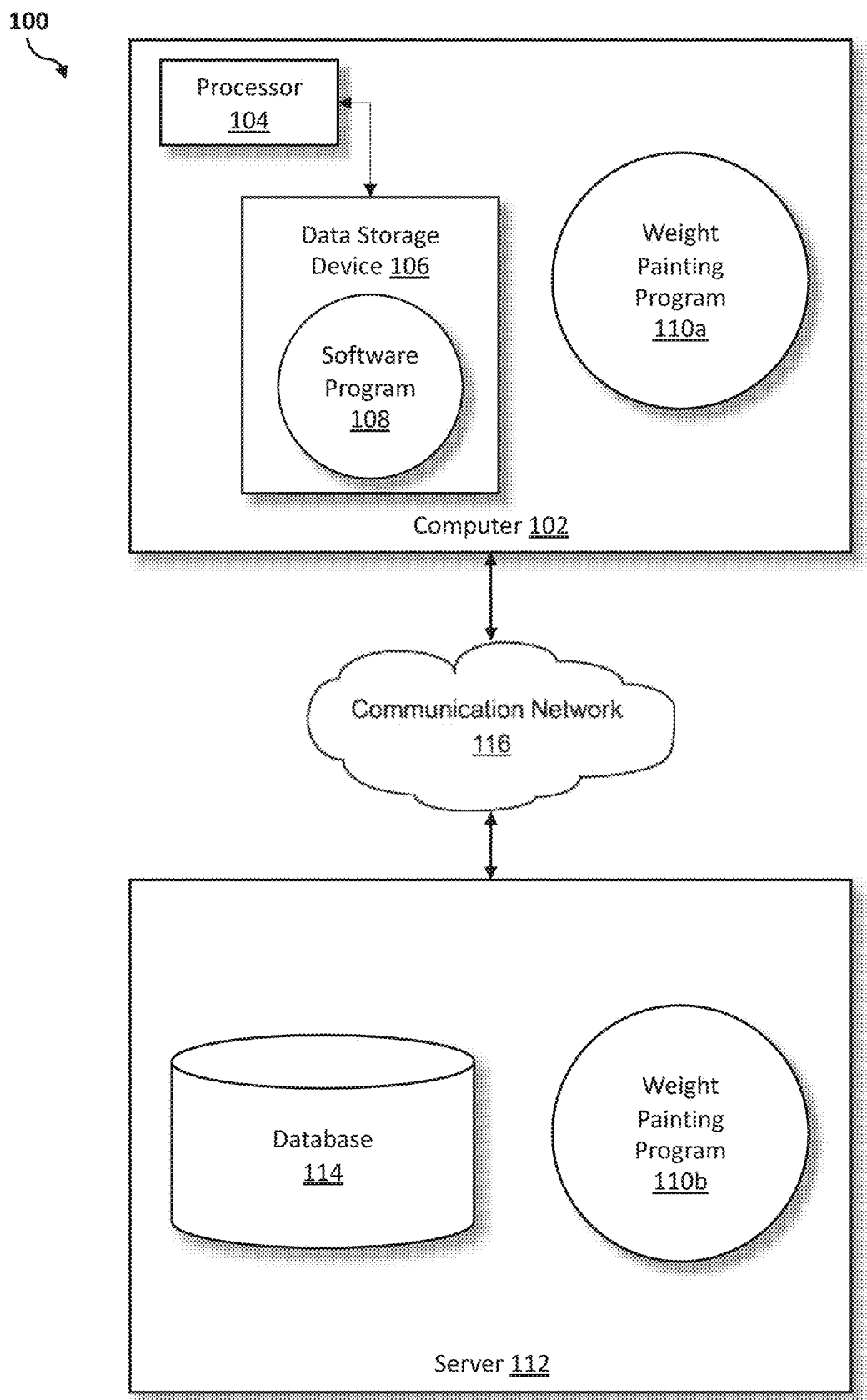
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for projecting a 3D model defined by x, y, z coordinates onto the surface of a 2D image defined by u, v coordinates is provided. As such, the present embodiment has the capacity to improve the technical field of automatic partitioning of UV maps by enabling partitioning to be done based on the use of weight painting in 3D modeling software. More specifically, the present invention may include receiving a 3D model having a plurality of polygons, wherein certain edges are marked as seams. The present invention may include receiving input from a user, wherein the input comprises painting one or more parts of the 3D model in different colors, wherein the colors correspond with a weight of the area painted. The present invention may include unwrapping, by a processor, a 2D texture from the 3D model using a projection algorithm. The present invention may include generating a rectangular boundary around each island. The present invention may include scaling each island according to a gradient score.

As described previously, UV mapping may be a three-dimensional (i.e., 3D) modeling process of projecting a two-dimensional (i.e., 2D) image onto the surface of a three-dimensional model to give the two-dimensional image color and/or texture. The "U" and the "V" of "UV" may refer to the horizontal and vertical axes, respectively, of the two-dimensional space, as X, Y, and Z may already be used in a three-dimensional space. Three-dimensional modeling and/or texturing software may provide an automated process to unwrap a three-dimensional model.

However, existing three-dimensional modeling and/or texturing software may require a three-dimensional (i.e., 3D) artist (i.e., the artist) to manually manipulate a UV coordinate set in order to achieve a desired result. Depending on a capability of the three-dimensional artist (i.e., the artist), this may result in a high number of seams and/or an overlapping set of UV coordinates depicted on a UV map (e.g., a distorted, messy, and/or unrecognizable image). This challenge faced by artists may result in a need for a modification of an artist's workflow.

Furthermore, adjusting a scale of UV coordinates (e.g., included in a polygon mesh, which is the collection of vertices, edges, and faces that make up a three-dimensional object) may be both time consuming and tedious. A small scale of UV coordinates may result in a blocky appearance while a high scale of UV coordinates may include significantly more detail.

Therefore, it may be advantageous to, among other things, utilize a weight map, painted on by the three-dimensional artist (i.e., the artist), corresponding to a level of importance of elements (e.g., components, areas) of an image so that each element of the image may be placed into a UV island (e.g., where the UV island depicts a non-overlapped set of UV coordinates representing the element of the image). A two-dimensional (i.e., 2D) image may have a plurality of UV islands for depiction in a three-dimensional (i.e., 3D) space. By signifying an importance of a particular element on the three-dimensional model, an unwrapping algorithm may be able to further adjust a scale of the UV islands.

According to at least one embodiment, the present invention may enable a user to input a three-dimensional (i.e., 3D)

model, unwrap a two-dimensional (i.e., 2D) texture from the three-dimensional model, apply weight paint (e.g., user-selected colors) to the unwrapped two-dimensional texture, and scale elements of the unwrapped two-dimensional texture based on the user's applied weight paint.

According to at least one embodiment, a user may apply weight paint to a mesh within a software application used for three-dimensional (i.e., 3D) modeling (e.g., where a mesh may be a structural build of a three-dimensional model consisting of polygons (e.g., straight-sided shapes defined by three-dimensional points called vertices and the straight lines that connect them called edges). The applied weight paint may result in a portion of the mesh being unwrapped from a 3D model to a two-dimensional (i.e., 2D) texture which takes up a larger or smaller portion of a UV coordinate plane based on a determined importance level of the portion of the mesh. This may be an improvement upon current functionality of software applications used for 3D modeling because current software applications do not scale a size of a portion of an image immediately upon unwrapping based on a received user input.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a weight painting program 110a. The networked computer environment 100 may also include a server 112 that is enabled to run a weight painting program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 4, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the weight painting program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the weight painting program 110a, 110b (respectively) to accurately project a 3D model defined by x, y, z coordinates onto the surface of a 2D image defined by u, v coordinates, giving more weight to important areas of the 3D model, by using weight paint in 3D modeling software. The weight painting method is explained in more detail below with respect to FIGS. 2 and 3.

Figure 2:
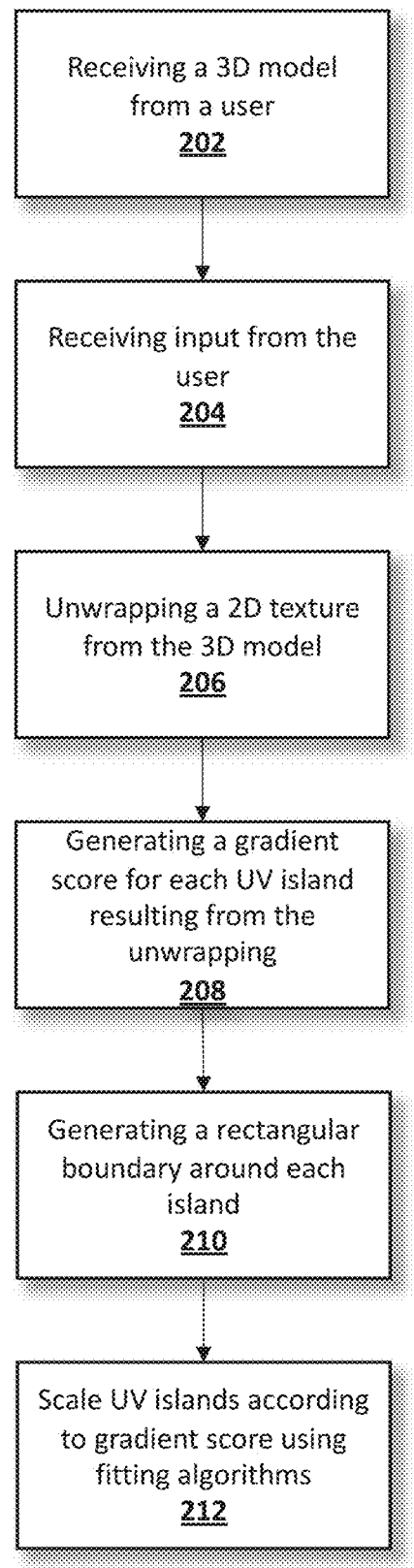
FIG. 2 is an operational flowchart illustrating a process for *** according to at least one embodiment.

Referring now to FIG. 2, an operational flowchart illustrating the exemplary weight painting process 200 used by the weight painting program 110a and 110b according to at least one embodiment is depicted.

At 202, the weight painting program 110a and 110b receives a three-dimensional (i.e., 3D) model from a user. A computer graphics software toolset used for creating animated films, visual effects, art, 3D printed models, motion graphics, virtual reality, computer games, and/or interactive 3D effects, may be used to receive a 3D model. For example, a cube-shaped 3D model (i.e., a cube) may be received by Blender® (Blender and all Blender-based trademarks are trademarks or registered trademarks of The Blender Foundation in the United States, and/or other countries), or any other software application capable of being used for 3D modeling. The cube may be comprised of six faces, each with four vertices, which together make up a mesh (e.g., a polygon mesh). A mesh may be a collection of vertices, edges, and faces that may define the shape of a three-dimensional object. For example, a single face may have, at a minimum, three vertices (e.g., for a triangular shape).

During an unwrapping of a three-dimensional (i.e., 3D) model, as will be described in more detail with respect to step 206 below, each face of the mesh may be cut along defined edges. A software application used for the 3D modeling may know, at least for primitive shapes, where the edges are. For more complex shapes, the software application used for 3D modeling may not accurately cut the mesh into faces. A user may, additionally and/or alternatively, mark seams on the 3D model to identify for the software application where the mesh should be cut. In this case, the software application may cut along the lines defined by the user.

At 204, the weight painting program 110a and 110b receives input from the user. Received user input may include a weight map, generated by placing weight paint onto the 3D model by the user (e.g., an artist). Weight painting may, for example, be used for deforming vertices around a bone structure for use in animation, and the present invention may utilize weight painting to distinguish areas of importance of a received three-dimensional (3D) model. Any software application capable of being used for 3D modeling may enable weight painting by a user.

Weight paint may directly correlate to a scaling rate of a component of the 3D model. According to at least one gradient scale, blue may signify no importance while red may signify high importance. The gradient scale may be a primary factor which influences a scaling rate. Calculations may be made for an entire island (as will be described in more detail with respect to step 208 below) if the weight painting program 110a and 110b determines that a gradient is different in different regions of the island. An average gradient value may be calculated to obtain a single value which represents a gradient value of the entire island.

As described previously, according to at least one embodiment, the color red may represent areas of most significance while blue may represent areas of least significance. The user may paint red on areas of the three-dimensional (3D) model which are most visible (e.g., a human's shoulder or piece of armor, among many other things). The user may likewise paint blue on areas of the three-dimensional (3D) model which may not be seen. This may include, for example, an armpit and/or a neck area on the three-dimensional (3D) model, among many other areas of the 3D model.

A corresponding importance of weight paint colors may be an industry standard for weight painting used in three-dimensional (3D) animations, however the present invention may not prohibit a user from modifying the weight paint colors if doing so may increase productivity and/or enable an additional functionality required by the user.

Resulting gradient information may direct the software application to an area of the mesh which the artist marks as important. An artist's input regarding gradient information may feed into a size of a corresponding portion of the 3D model on a UV map. For example, areas of the 3D model that are deemed to be of higher importance may be given more space on a UV map so that these areas may be viewed with higher resolution. Conversely, areas that are deemed to be of lower importance may be given less space on a UV map since it may not matter whether the corresponding portion of the 3D model is viewed with high resolution on the UV map.

At 206, the weight painting program 110a and 110b unwraps a two-dimensional (i.e., 2D) texture from the received three-dimensional (i.e., 3D) model. The 2D texture may be unwrapped from the 3D model using a projection algorithm. The projection algorithm may include, but is not limited to including, a cube projection, a sphere projection, and/or a camera or view projection.

When the weight painting program 110a and 110b unwraps the 2D texture from the 3D model, the weight painting program 110a and 110b may take into consideration the weight map, as discussed previously with respect to step 204 above, to prioritize areas of higher significance and to allocate more UV space (e.g., more space in a u,v coordinate plane) for the higher prioritized areas (e.g., UV islands with a determined higher priority). A greater amount of UV space may correlate to more details being seen on the 3D model. Likewise, areas of lower significance may be given less UV space and fewer details may be shown on a final rendering of the lower prioritized areas.

At 208, the weight painting program 110a and 110b generates a gradient score for each UV island resulting from the unwrapping. The generated gradient score may correspond to a scaling rate which may influence a space allocation of the three-dimensional (i.e., 3D) model onto a two-dimensional (i.e., 2D) u,v coordinate plane.

As described previously with respect to step 206 above, once a UV map has been generated and UV islands have been identified, the weight painting program 110a and 110b may begin the process of UV space allocation. A gradient on islands may be relatively consistent, however, an average of the weights (e.g., based on input received from a user, as described previously with respect to step 204 above) on an island may be calculated to generate a gradient score. This may assume that a painted color has a corresponding mathematical value such that a numerical average may be calculated. The corresponding mathematical value may be a value configurable by a user (e.g., not a standard value). For example, according to at least one embodiment, the corresponding mathematical value may be a numerical value on a normalized scale ranging from 0 to 1, where 1 indicates areas of high importance and 0 indicates areas of no importance. The scale may be manipulable by the user to achieve a desired unwrapped result. The numerical average may be determined by dividing a total of all mathematical values a number of mathematical values.

The gradient score may correspond to a scaling rate, which may be configurable by a user and which may default to 1. The scaling rate may determine an initial size of an island (e.g., a portion of 3D model). This may be an estimated size which may be adjusted based on a determined gradient score. Incrementally, an island may grow or shrink depending on a determined scaling rate and the determined scaling rate of other islands which are to be projected onto the two-dimensional (i.e., 2D) u,v coordinate plane. For example, an island may grow until there is no more space to grow in a particular direction of the u,v coordinate plane. As another example, an island may grow according to a bin packing algorithm (e.g., an NP problem in which items of different volumes must be packed into a finite number of bins or containers each of a fixed given volume in a way that minimizes a number of bins used) which may attempt to best fit the shapes on the u,v coordinate plane and to fit the shapes together in a best possible way. The weight painting program 110a and 110b may run through enough iterations of the bin packing algorithm until a resulting 2D texture is achieved which achieves an appearance acceptable by a user.

At 210, the weight painting program 110a and 110b generates a rectangular boundary (i.e., a bounding box, a boundary box) around each island of the UV model. A rectangular boundary box may be generated by identifying four vertices around each island of the UV model. In order to ensure an island of the UV model is captured within a rectangular boundary, the northernmost, southernmost, easternmost, and westernmost points (e.g., vertices) of the island may be identified. The software application used for 3D modeling may generate a rectangular boundary using a u,v coordinate plane (e.g., by identifying a highest U, a lowest U, a highest V, and a lowest V).

As described previously, a rectangular boundary around each island may be generated by comparing points within a u,v coordinate plane that make up an island to see which of the points are the farthest outliers (e.g., the four farthest outliers in each direction may become the four corners of the rectangular boundary box).

A rectangular boundary around each island may be utilized to generate the gradient score. For each island, a gradient score and bounds (e.g., a boundary box) may be determined. A rectangular boundary box may enable the weight painting program 110a and 110b to identify a center of mass of each island. From this center, the weight painting program 110a and 110b may scale each corner of a boundary box according to a scaling rate (e.g., which may be configurable by a user and which may default to 1, as described previously with respect to step 208 above).

Once an edge of a boundary box reaches another boundary box and/or an edge of the coordinate plane, the boundary box may stop growing in that direction. This process of scaling each island may be iterated until all boundary boxes (e.g., a boundary box is around an island) may no longer be able to grow.

The generated rectangular boundary boxes may be used, primarily, for packing purposes (e.g., for use with a bin packing algorithm). By calculating a gradient score (as described previously with respect to step 208 above) before generating the rectangular boundary box, the weight painting program 110a and 110b may ensure that the calculations are more tailored (e.g., more closely fit) around an island and that there is little to no blank areas in the calculations.

At 212, the weight painting program 110a and 110b scales the UV islands according to a gradient score using at least one fitting algorithm (e.g., bin packing algorithm). The fitting algorithm may have a goal of fitting as many UV islands as possible into the UV coordinate space, while maintaining a size and/or proportion determined by the applied weight paint, as discussed above, with a requirement that all UV islands generated by the weight painting program 110a and 110b must fit into the UV coordinate space. The fitting algorithm (e.g., bin packing algorithm) may enable the weight painting program 110a and 110b to grow and shrink the UV islands until all UV islands achieve a best fit within the UV coordinate space.

As described previously with respect to step 210 above, once all boundary boxes have reached a maximum size, the weight painting program 110a and 110b may partition the UV model based on the locations of seams of the UV model (e.g., which have been allocated UV coordinate space based on a scaling rate configured by the user). In a resulting UV map, each island may be allocated UV space (e.g., space in a u,v coordinate plane) which does not overlap with another island.

A scaling rate may be a percentage of a total gradient score across an entire UV map. For example, if there are five islands and each of the five islands is colored red with weight paint, then each island may evenly take up one fifth of the UV map (e.g., the u,v coordinate plane).

Partitioning of the UV islands may be done by cutting along marked seams. For example, once a seam is manually marked by an artist, the weight painting program 110a and 110b may cut along the marked seams to achieve a resulting 2D texture unwrapped into a u,v coordinate plane.

Figure 3:
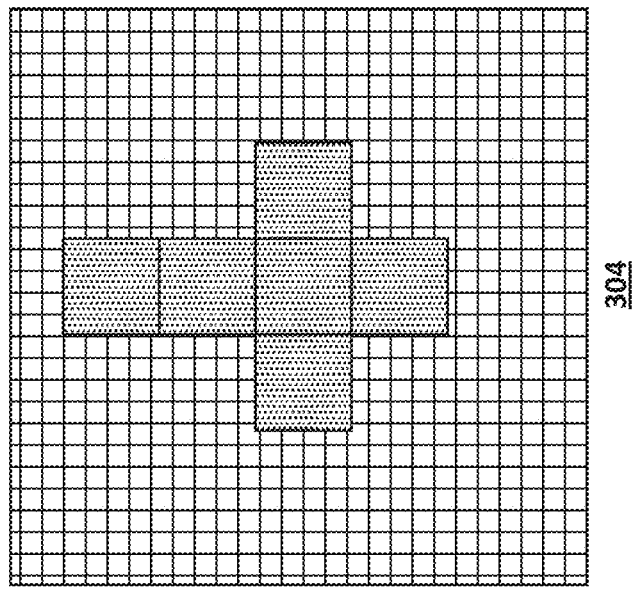
FIG. 3 is a block diagram of an unwrapping process according to at least one embodiment.
Figure 3:
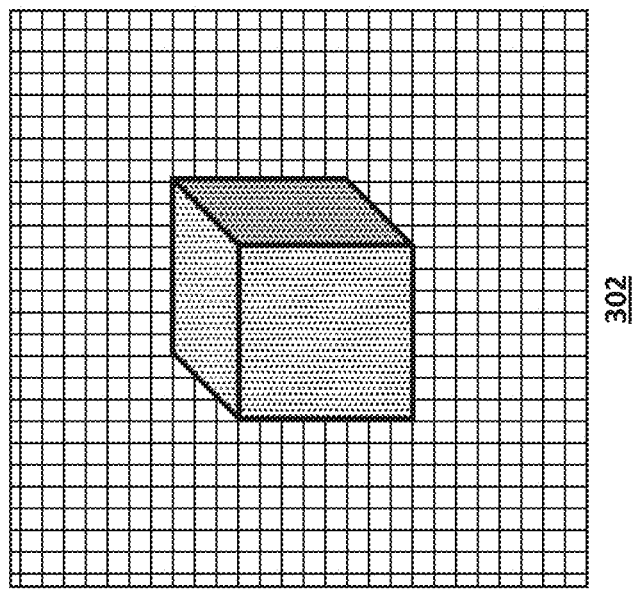

Referring now to FIG. 3, a block diagram of an unwrapping process according to at least one embodiment is depicted. A three-dimensional (i.e., 3D) cube 302 may be received by a user in a 3D modeling software along with user input regarding location of seams and weight paint to indicate an importance of areas of the received cube. The cube is depicted in an x, y, z coordinate plane. The received 3D model (e.g., the cube here) is then unwrapped into a two-dimensional (i.e., 2D) texture 304. The 2D texture is depicted in a u,v coordinate plane. As described above, based on the received user input, a gradient score may then be generated for each UV island resulting from the unwrapping (e.g., each resulting square face of the received cube), a rectangular boundary box may be generated around each island and the islands may be scaled according to the gradient score using fitting algorithms and/or a bin packing algorithm.

It may be appreciated that FIGS. 2 and 3 provide only an illustration of one embodiment and do not imply any limitations with regard to how different embodiments may be implemented. Many modifications to the depicted embodiment(s) may be made based on design and implementation requirements.

Figure 4:
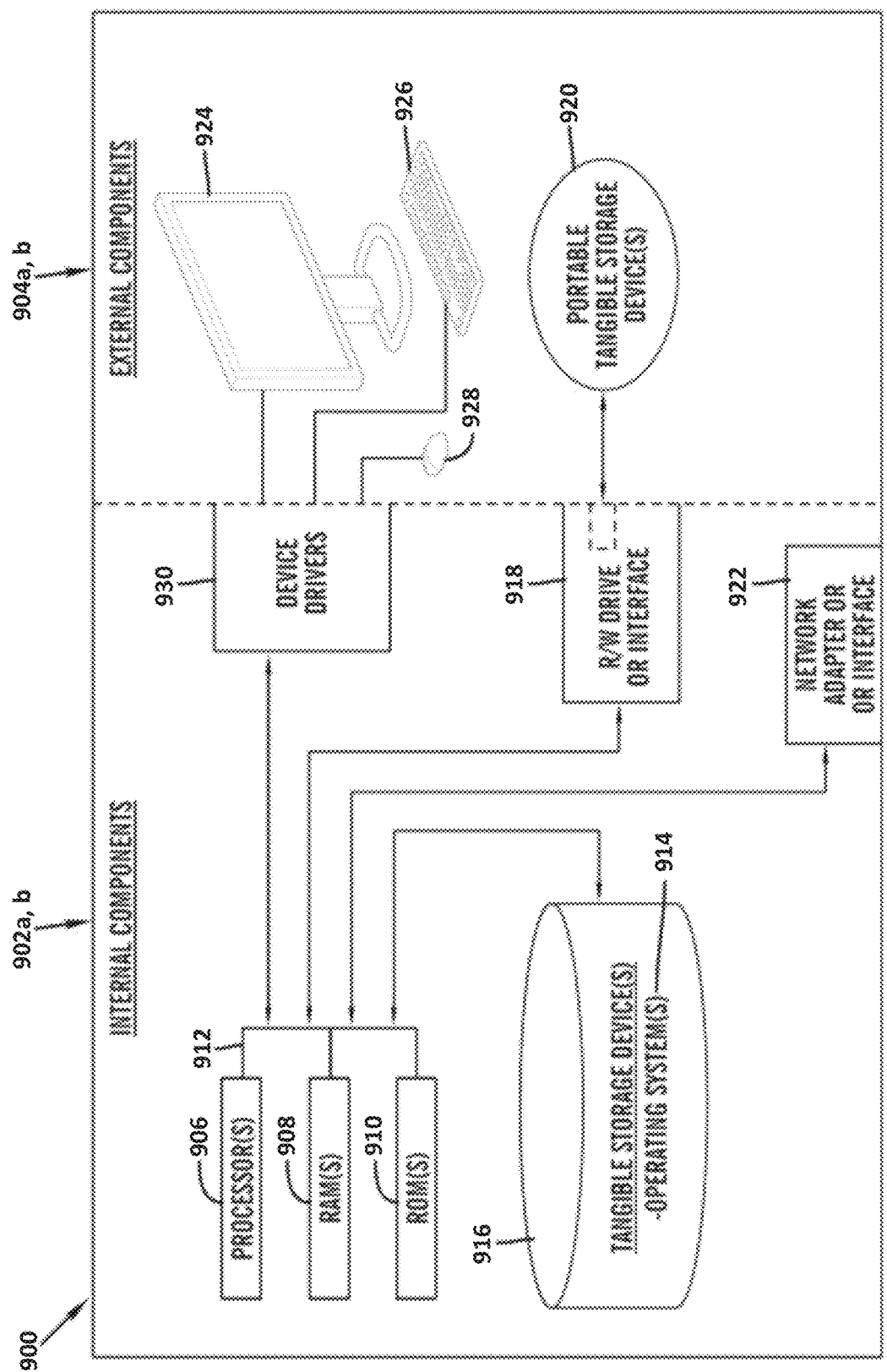
FIG. 4 is a block diagram of internal and external components of computers and servers depicted in FIG. 1 according to at least one embodiment.

FIG. 4 is a block diagram 900 of internal and external components of computers depicted in FIG. 1 in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may be represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902 a, b and external components 904 a, b illustrated in FIG. 4. Each of the sets of internal components 902 a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108, and the weight painting program 110a in client computer 102, and the weight painting program 110b in network server 112, may be stored on one or more computer-readable tangible storage devices 916 for execution by one or more processors 906 via one or more RAMs 908 (which typically include cache memory). In the embodiment illustrated in FIG. 4, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the weight painting program 110a and 110b can be stored on one or more of the respective portable computer-readable tangible storage devices 920, read via the respective R/W drive or interface 918 and loaded into the respective hard drive 916.

Each set of internal components 902 a, b may also include network adapters (or switch port cards) or interfaces 922 such as a TCP/IP adapter cards, wireless wi-fi interface cards, or 3G or 4G wireless interface cards or other wired or wireless communication links. The software program 108 and the weight painting program 110a in client computer 102 and the weight painting program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the weight painting program 110a in client computer 102 and the weight painting program 110b in network server computer 112 are loaded into the respective hard drive 916. The network may comprise copper wires, optical fibers, wireless transmission, routers, firewalls, switches, gateway computers and/or edge servers.

Each of the sets of external components 904 a, b can include a computer display monitor 924, a keyboard 926, and a computer mouse 928. External components 904 a, b can also include touch screens, virtual keyboards, touch pads, pointing devices, and other human interface devices. Each of the sets of internal components 902 *a, b* also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
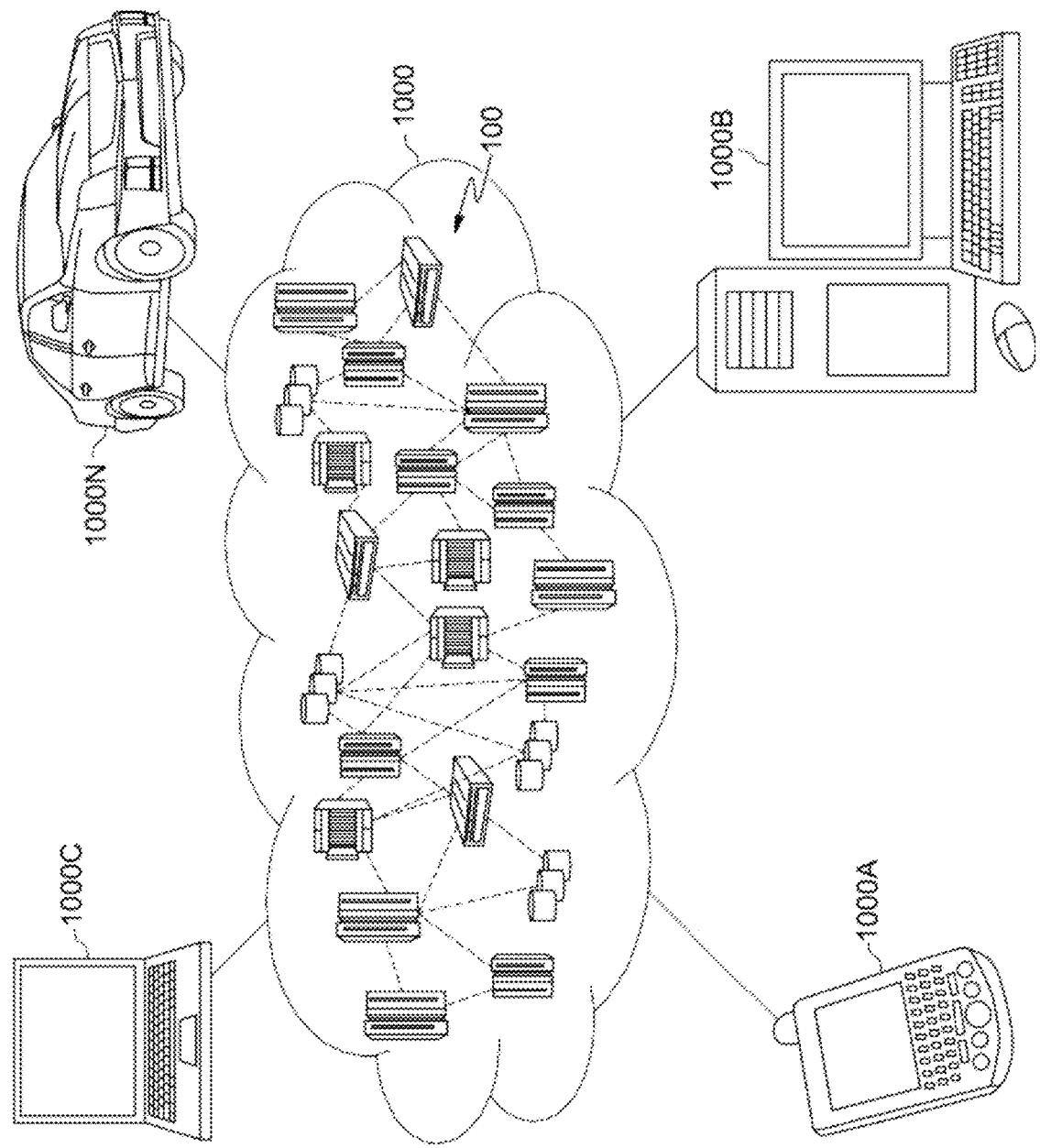
FIG. 5 is a block diagram of an illustrative cloud computing environment including the computer system depicted in FIG. 1, in accordance with an embodiment of the present disclosure.

Referring now to FIG. 5, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 5 are intended to be illustrative only and that computing nodes 100 and cloud computing environment 1000 can communicate with any type of computerized device over any type of network and/or network addressable connection (e.g., using a web browser).

Figure 6:
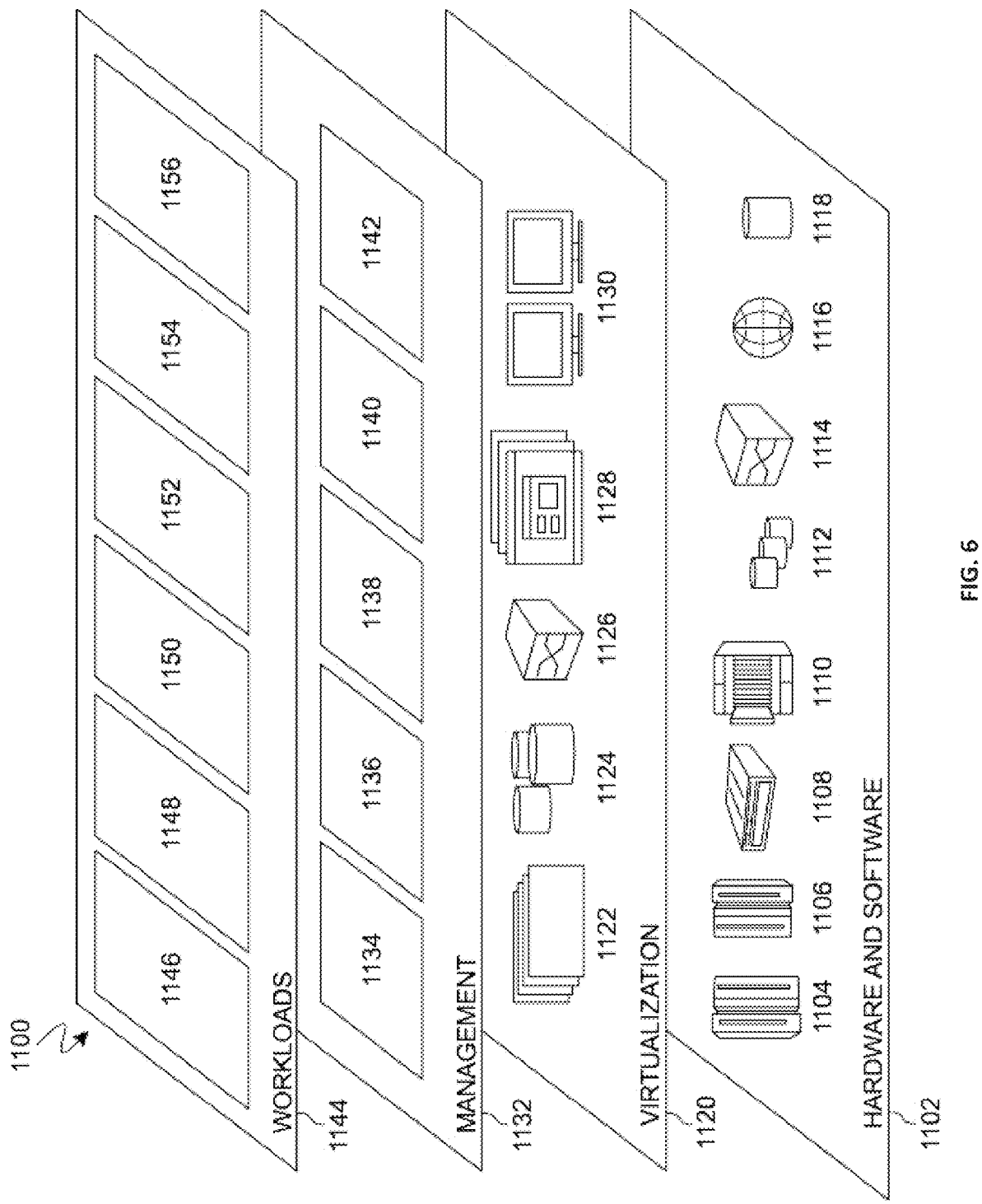
FIG. 6 is a block diagram of functional layers of the illustrative cloud computing environment of FIG. 5, in accordance with an embodiment of the present disclosure.

Referring now to FIG. 6, a set of functional abstraction layers 1100 provided by cloud computing environment 1000 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and weight painting 1156. A weight painting program 110a, 110b provides a way to accurately project a 3D model defined by x, y, z coordinates onto the surface of a 2D image defined by u, v coordinates, giving more weight to important areas of the 3D model, by using weight paint in 3D modeling software.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for projecting a 3D model defined by x, y, z coordinates onto the surface of a 2D image defined within a u, v coordinate plane, comprising:
    receiving a 3D model having a plurality of polygons, wherein certain edges are marked as seams;
    receiving input from a user, wherein the input comprises painting one or more parts of the 3D model in different colors, wherein the colors correspond with a weight of the area painted;
    unwrapping, by a processor, a 2D texture from the 3D model using a projection algorithm;
    generating a rectangular boundary around each island;
    identifying a center of each island; and
    scaling each island and the associated rectangular boundary from the identified center of each island of mass according to a gradient score until an edge of the associated rectangular boundary reaches an edge of a different rectangular boundary around another island.

2. The computer-implemented method of claim 1, further comprising receiving input from a user, wherein the input comprises adjusting the u, v coordinates of each island.

3. The computer-implemented method of claim 1, wherein the 3D model is received from a user in a computer software used for 3D modeling.

4. The computer-implemented method of claim 1, wherein the projection algorithm allocates u, v space based on the weight defined by the painted color, a more important area receiving more u, v space and a less important area receiving less u, v space.

5. The computer-implemented method of claim 1, wherein the gradient score is generated at seams of a UV model, the UV model being the 2D image in the u, v coordinate plane, wherein the weight is averaged to create a gradient at the seams at the edges of islands.

6. The computer-implemented method of claim 5, further comprising:
    partitioning the UV model into islands based on a location of seams.

7. The computer-implemented method of claim 1, wherein scaling each island according to the gradient score is done using a fitting algorithm.

8. A computer system for projecting a 3D model defined by x, y, z coordinates onto the surface of a 2D image defined within a u, v coordinate plane, comprising:
    one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
    receiving a 3D model having a plurality of polygons, wherein certain edges are marked as seams;
    receiving input from a user, wherein the input comprises painting one or more parts of the 3D model in different colors, wherein the colors correspond with a weight of the area painted;
    unwrapping, by a processor, a 2D texture from the 3D model using a projection algorithm;
    generating a rectangular boundary around each island;
    identifying a center of each island; and
    scaling each island and the associated rectangular boundary from the identified center of mass of each island according to a gradient score until an edge of the associated rectangular boundary reaches an edge of a different rectangular boundary around another island.

9. The computer system of claim 8, further comprising receiving input from a user, wherein the input comprises adjusting the u, v coordinates of each island.

10. The computer system of claim 8, wherein the 3D model is received from a user in a computer software used for 3D modeling.

11. The computer system of claim 8, wherein the projection algorithm allocates u, v space based on the weight defined by the painted color, a more important area receiving more u, v space and a less important area receiving less u, v space.

12. The computer system of claim 8, wherein the gradient score is generated at seams of a UV model, the UV model being the 2D image in the u, v coordinate plane, wherein the weight is averaged to create a gradient at the seams at the edges of islands.

13. The computer system of claim 12, further comprising: partitioning the UV model into islands based on a location of seams.

14. The computer system of claim 8, wherein scaling each island according to the gradient score is done using a fitting algorithm.

15. A computer program product for projecting a 3D model defined by x, y, z coordinates onto the surface of a 2D image defined within a u, v coordinate plane, comprising:
one or more non-transitory computer-readable tangible storage media and program instructions stored on at least one of the one or more non-transitory computer-readable tangible storage media, the program instructions executable by a processor to cause the processor to perform a method comprising:
receiving a 3D model having a plurality of polygons, wherein certain edges are marked as seams;
receiving input from a user, wherein the input comprises painting one or more parts of the 3D model in different colors, wherein the colors correspond with a weight of the area painted;
unwrapping, by a processor, a 2D texture from the 3D model using a projection algorithm;
generating a rectangular boundary around each island;
identifying a center of each island; and
scaling each island and the associated rectangular boundary from the identified center of mass of each island according to a gradient score until an edge of the associated rectangular boundary reaches an edge of a different rectangular boundary around another island.

16. The computer program product of claim 15, further comprising receiving input from a user, wherein the input comprises adjusting the u, v coordinates of each island.

17. The computer program product of claim 15, wherein the 3D model is received from a user in a computer software used for 3D modeling.

18. The computer program product of claim 15, wherein the projection algorithm allocates u, v space based on the weight defined by the painted color, a more important area receiving more u, v space and a less important area receiving less u, v space.

19. The computer program product of claim 15, wherein the gradient score is generated at seams of a UV model, the UV model being the 2D image in the u, v coordinate plane, wherein the weight is averaged to create a gradient at the seams at the edges of islands.

20. The computer program product of claim 19, further comprising:
partitioning the UV model into islands based on a location of seams.

* * * * *